United States Patent
Cazanas et al.

(10) Patent No.: US 9,326,187 B2
(45) Date of Patent: Apr. 26, 2016

(54) CONTENT MANAGEMENT DELIVERY SYSTEM (CMDS) FACILITATED LOCAL ACCESS SYSTEM

(71) Applicant: Cellco Partnership, Basking Ridge, NJ (US)

(72) Inventors: Carlos A. Cazanas, Bethlehem, PA (US); Victor M. Pagan, Breinigsville, PA (US); Kalpan S. Shah, Bridgewater, NJ (US); Phillip A. Leone, Frenchtown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 151 days.

(21) Appl. No.: 14/140,903

(22) Filed: Dec. 26, 2013

(65) Prior Publication Data

US 2015/0189542 A1  Jul. 2, 2015

(51) Int. Cl.
| | | |
|---|---|---|
| *H04L 12/28* | (2006.01) | |
| *H04H 20/71* | (2008.01) | |
| *H04W 4/00* | (2009.01) | |
| *H04W 28/02* | (2009.01) | |
| *H04L 12/18* | (2006.01) | |
| *H04W 4/02* | (2009.01) | |

(52) U.S. Cl.
CPC ......... *H04W 28/0289* (2013.01); *H04L 12/189* (2013.01); *H04W 4/02* (2013.01)

(58) Field of Classification Search
CPC ......... H04W 4/02; H04W 4/021; H04W 4/06; H04W 4/08; H04W 28/0289; H04W 52/0251; H04W 72/005; H04W 76/002; H04L 12/18; H04L 12/185; H04L 12/189; H04L 12/1845; H04L 49/201; H04L 65/4076; H04L 65/4084; H04L 67/18; H04N 7/165; H04N 21/258; H04N 21/278; H04N 21/431; H04N 21/854; H04N 21/2407; H04N 21/4524; H04N 21/6405; H04N 21/25841; H04N 21/25875; H04N 21/44213; H04N 21/44222; G06F 9/542
USPC ................. 370/310–350, 229–240, 386–399, 370/400–411, 432, 485–490; 709/217–219, 709/230–245
See application file for complete search history.

(56) References Cited

U.S. PATENT DOCUMENTS

| | | | | |
|---|---|---|---|---|
| 8,271,574 | B1 * | 9/2012 | Srinivasan | G06Q 10/101 709/201 |
| 8,646,016 | B2 * | 2/2014 | Kubat et al. | 725/110 |
| 2004/0203336 | A1 * | 10/2004 | Sinnarajah | H04W 36/08 455/3.01 |
| 2004/0203655 | A1 * | 10/2004 | Sinnarajah et al. | 455/414.1 |
| 2006/0190589 | A1 * | 8/2006 | Parker | H04H 20/82 709/224 |
| 2007/0217436 | A1 * | 9/2007 | Markley | H04L 12/2803 370/401 |
| 2008/0287057 | A1 * | 11/2008 | Zisimopoulos | H04W 72/005 455/3.01 |
| 2010/0228814 | A1 * | 9/2010 | McKenna | H04W 4/06 709/203 |
| 2011/0013775 | A1 * | 1/2011 | Hu et al. | 380/278 |
| 2013/0081072 | A1 * | 3/2013 | Alward | H04L 12/189 725/14 |
| 2013/0111520 | A1 * | 5/2013 | Lo et al. | 725/35 |

* cited by examiner

*Primary Examiner* — Tri H Phan

(57) ABSTRACT

A method of sharing a streaming content item to a target user equipment (UE) device on a network includes identifying a UE device on the network that is currently receiving the content item. The method determines whether the target and source UE devices are serviced by a common base station. If they are, the method commands the base station to multicast the content item to the UE device and the target UE device. The method also includes sharing a content item stored on a first UE device with a second UE device by commanding the first UE device to send the content item to the second UE device without going through the network or by commanding the first UE device to upload the content item to the base station and then downloading the content item from the base station to the first UE device.

20 Claims, 5 Drawing Sheets

CONTENT MANAGEMENT DELIVERY SYSTEM (CMDS) FACILITATED LOCAL ACCESS SYSTEM

BACKGROUND

Wireless networks transport traffic associated with a variety of services, applications, and content including voice, text, video and data. Typically, the content is managed and controlled by a content server module. Subscribers of the wireless service provider receive content (e.g., video streams) on user devices from content provider servers or sources via a base station.

Network traffic is continually increasing due to the popularity of streaming and downloading of multimedia content. As such, the network can become overloaded, resulting in lag or delay, and decrease the user's overall experience on the network. Efficient management of distribution of content can economize the usage of network bandwidth and components and at the same time make the content readily available to the user devices.

DETAILED DESCRIPTION OF PREFERRED EMBODIMENTS

Figure 1:
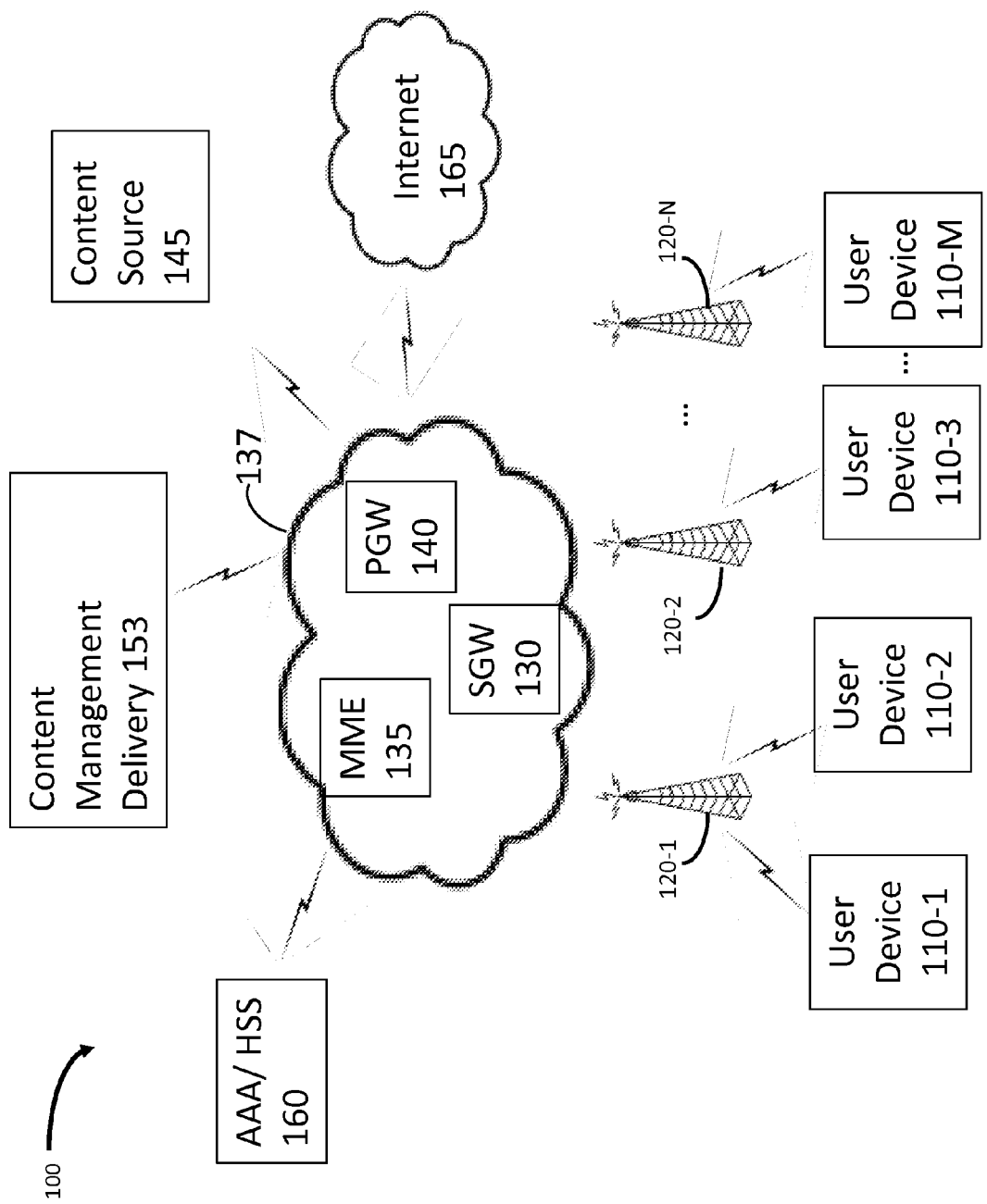
FIG. 1 is a diagram of an example environment in which systems and/or methods described herein may be implemented.

The following detailed description refers to the accompanying drawings. The same labels and/or reference numbers in different drawings may identify the same or similar elements. Also, the following detailed description does not limit the invention.

In one or more implementations, devices may be used to control the delivery of multimedia content, including audio, video and data to user equipment (UE) devices in a wireless network.

The term "wireless node," is intended to be broadly interpreted to include a device that wirelessly communicates with a user device (e.g., user equipment (UE)). By way of example, but not limited thereto, a wireless node may correspond to an evolved Node B (eNB), a base station (BS), a base station controller (BSC), a Node B, a base transceiver station (BTS), a relay node, a repeater, a home eNB, a radio node, or a UE-gateway (UE-GW). The wireless node may support one access and/or wireless technology or multiple access and/or wireless technologies.

The term "delivery of content," or "content delivery" as used herein, is to be broadly interpreted to include data flow from a server (e.g., a content management delivery server) to a user device and from one user device to another user device. The delivery of content comprises delivery of compressed, uncompressed and/or encoded audio data, compressed, uncompressed and/or encoded video data, or other multimedia data, etc.

By way of example, but not limited thereto, within a Long Term Evolution (LTE) network, delivery of content may permit data to flow from one user device to another user device through one or more wireless nodes (e.g., one or more eNBs) to serving the devices without traversing higher layers of the LTE network (e.g., a serving gateway (SGW) or a packet data network (PDN) gateway (PGW)). However, it will be appreciated that delivery of content may be applicable to networks other than LTE. In this regard, the term "network," as used herein, is intended to be broadly interpreted to include a wireless network (e.g., mobile network, cellular network, non-cellular network, etc.). By way of example, but not limited thereto, delivery of content may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, and/or another type of wireless network (e.g., an ad hoc network, etc.), or some other type of wired network.

Depending on the type of network, content delivery may be performed by wireless nodes not specifically described herein that provide corresponding functionality. By way of example, but not limited thereto, delivery of content may be performed by a BS, a BSC, an e Node-B (eNB), a network access device, a serving GPRS support node (SGSN), etc.

In an exemplary implementation within a network, eNBs may be permitted to initiate and support peer-to-peer routing so that data flows between users without traversing higher layers of the network (e.g., network devices in an evolved packet core (EPC)). This may result in significant efficiencies being gained. It may, for example, result in reduced congestion at the higher layer network devices, fewer resources being used and enhanced fidelity (e.g., by avoiding or minimizing additional processing, such as repeated compression/decompression or encoding/decoding cycles as the data flow traverses the communication path). Additionally, communication between UEs may involve fewer hops, resulting in an improvement in end-to-end latency and reduce dropped packets.

In an exemplary implementation, normal communication (e.g., request for content from a UE device) may proceed over the EPCs. For example, a UE device may communicate with a content management delivery server via an eNB, an SGW and a PGW to send a request for content. The server may then send the content back to the UE device through the PGW, SGW and eNB. In another example, UE devices within the same operator network, may communicate with each other and a data flow may traverse only the eNB(s) or it may traverse the eNB(s), SGW and PGW. UE devices may also communicate within different operator networks, and a data flow may traverse the eNBs, SGWs and PGWs (or equivalents) of the different networks.

In the exemplary implementation, and as described below, UE devices within the same operator network may share data or content without involving SGW and PGW. Additionally, in another exemplary implementation, content may be shared without involving SGW and PGW, while the UEs are attached to different eNBs. In such a scenario, eNBs may communicate the content using their X2 communication interface, which is typically used for handoff communication. For example, UE devices may communicate via eNBs within the same operator network.

FIG. 1 is a diagram showing an overview of an example implementation. As shown in FIG. 1, a network environment 100 may include multiple UE devices 110-1, 110-2, 110-3, . . . , 110-M (where M≤1) (referred to collectively herein as UE devices 110 and individually as UE device 110). In the example, the UE devices 110 obtain content over-the-air via a number of base stations. Hence, the network environment 100 also includes base stations 120-1, . . . , 120-N (where N≤1) (referred to collectively herein as "base stations 120" and individually as "base station 120"). The example network also includes a Service Gateway (SGW) 130 that is configured to communicate packet data with the UE devices 110 via the base stations 120, a packet data network gateway (PGW) that provides an interface between the SGW and a content source 145 and/or a global information network (e.g. the Internetn 165, a mobility management entity (MME) device 135 that is coupled to home subscriber service (HSS), authentication, authorization and accounting (AAA) server 160 to provide user profiles, authorization, authentication and accounting services for the data streams accessed by the UE devices 110. A content management delivery server 153 controls the delivery of content from the content source 145 or Internet 165 to the UE devices 110 by controlling how the base stations 120 access the delivered data, as described below. The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

In network environment 100, the content source 145 or Internet 165 provide unicast or multicast multimedia content, under control of content management delivery server 153, to the UE devices 110 via the base stations 120. A unicast content stream is sent to a single UE device. A multicast stream is sent to multiple UE devices.

The examples described below provide wireless communication services via multiple base stations located in a common geographic area. The base stations 120 in this example are evolved node B (eNB) base stations. Each eNB 120 is configured to multicast or unicast content items to UE devices locally (i.e., when the UE devices are served by the same eNB). The eNBs are arranged in the geographic area such that each UE device in the geographic area can connect to (e.g. camp on) one of the base stations. For example, UE 110-1 may camp on eNB 120-1 by selecting to connect to the eNB 120-1. While it is camped on, UE 110-1 receives system information of the eNB 120-1 and may register with the network using the eNB 120-1. Selection of the eNB 120-1 may be based on signal strength (e.g. UE device may select an eNB from a particular network that provides the strongest signal strength). Alternatively, the eNB 120-1 may be selected because it has been previously used by the UE device 110-1, even though another eNB may have a stronger signal. In either case, when the UE 110-1 moves away from the eNB 120-1, the network may hand-off the UE device to another eNB.

In some implementations, a UE device, 110-3, that is not camped-on the serving eNB 120-1 may also receive multimedia content currently being unicast to a UE device 110-1 that is camped on the eNB 120-1. In this example, the eNB 120-1 may communicate with another eNB, 120-2, (e.g., via X2 interface) to provide the content to the requesting UE device 110-3.

In some implementations, the multimedia content is managed by the content management delivery (CMD) server 153. The CMD server 153 may monitor the number of UE devices 110 that are receiving or would like to receive each content item and the location of each UE device 110 in relation to a corresponding eNB 120. Monitoring by the CMD server 135, in one implementation, may include accessing a UE/eNB pair table (as described in detail below). In another implementation, monitoring may include consulting a content subscription database (not shown) corresponding to a UE device to determine content items that are likely to be accessed. The database may store information on content items to which the User of the UE device has subscribed, preferred quality for the subscribed content (e.g., 1020p format or 720p format), modifications of the preferred quality based on location (e.g., UE device may prefer to receive a lower quality of the subscribed content if the UE device is roaming. In one example, the CMD server 153 may send a request to the content source to provide access to the content subscription database. Alternatively, the CMD server 153 may store the database while distributing the content to a UE device. In another example, CMD server 153 may request other components of the network (e.g., AAA/HSS server) to provide content subscription information from user profile information associated with a UE device.

The CMD server 153 may also monitor the condition of the network 100 (e.g., network congestion, network resources, dates and times, the number of UE devices within the service venue area, etc.). For example, to monitor congestion, the CMD server 153 may compare the bandwidth at various nodes in the network to the amount of data flowing through the nodes. Furthermore, the CMD server 153 may determine, based on the network conditions and data provided or received from a UE device, whether to provide a particular content item to one or more of the UE devices as a multicast or unicast transmission. The CMD server 153 may also control the source of the multimedia content, providing it from the content source 145, Internet 165 or one of the UE devices 110. In one implementation, the CMD server 153 may monitor congestion by receiving notifications, such as signals, messages, or alerts from an eNB. For example, eNB 120-1 may notify the CMD server 153 that it is approaching or it has reached the maximum number of UE devices that it can serve. Upon receiving the notification, CMD server 153 may not allow any new UE device to connect to eNB 120-1 to receive a requested content. This may reduce the network congestion of the eNB 120-1. Alternatively, the CMD server 153 may compare the combined bandwidth of the content items being sent to the various eNBs on the network against their known bandwidth capabilities. As the content bandwidth approaches the limit for any eNB, the CMD server 153 may reduce the quality of the content items or cause the eNB to multicast some content to make bandwidth available.

In one example, the CMD server 153 may consult a database (e.g., a content subscription database or another database stored in the network) that contains various information related to multiple content items provided by content source 145. The database may be stored either in the content source 145 or in other elements of the network. The database may include information related to the number of users who have subscribed to receive a particular content item. Using this information, the CMD server 153 may rate the particular content item. CMD server 153 may also identify the content as popular based on the number of UE devices across the entire network that are currently viewing the content. In one implementation, CMD server 153 may decide whether to multicast or unicast a content item based on its popularity and/or the ranking. For example, CMD server 153 may multicast an item, if the content is identified as very popular. Alternatively, CMD server 153 may cause an item to be unicast if it has a low ranking (e.g., only a few subscribers).

The terms "multimedia content," "content," "content item" and "content element" as used herein, are interchangeable and may include any variety or combination of audio, video and data programming. Examples include: camera feeds, audio commentary, web content, text, music, concerts, radio programs, television programs, videos, shows, movies and/or one or more other types of media-based programming.

Also, in some implementations, one or more of the devices of network environment 100 may perform one or more functions described as being performed by another one or more of the devices of environment 100. Devices of environment 100 may interconnect via wired connections, optical connections, wireless connections, or a combination of wired, optical and wireless connections.

Implementations are described as being performed within a radio access network (RAN) that is based on a LTE network for explanatory purposes. In other implementations, the implementations may be performed within a RAN that is not based on a LTE network.

Network environment 100 may include an evolved packet system (EPS) that includes a LTE network and/or an evolved packet core (EPC) 137 that operates based on a third generation partnership project (3GPP) wireless communication standard. The LTE network may be a RAN that includes one or more small base stations 120 that take the form of eNBs. The EPC 137 may include SGW 130, MME 135, and/or PGW 140 that enable UE devices 110 to communicate with CMD 153, using unicast/multicast transmissions, and/or an Internet protocol (IP) multimedia subsystem (IMS) core (not shown).

With reference again to FIG. 1, UE device 110 may include any computation or communication device, such as a wireless mobile communication device that is capable of communicating with base station 120 and/or a server (e.g., CMD 153). Examples of the UE device 110 include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. UE device 110 may send traffic to and/or receive traffic from CMD 153. The UE devices are programmed with applications (Apps) that access content from the network. An example UE device 110 may have multiple Apps running at a given time and, thus, may access multiple unicast, multicast and broadcast streams. The UE device 110 may also access static content (e.g., prerecorded video) by running application programs (Apps).

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations 120 associated with the LTE network, and may send the aggregated traffic to CMD server 153 (e.g., via PGW 140) and/or other network devices associated with the EPC. SGW 130 may also receive traffic from the other network devices and/or may send the received traffic to UE device 110 via base station 120. SGW 130 may perform operations associated with handing-off UE devices 110 from and/or to other base stations 120 in the LTE network.

MME 135 may include one or more computation or communication devices that gather, process, search, store, and/or provide information in a manner described herein. For example, MME 135 may perform operations associated with handing off UE device 110, from a first base station 120-1 to a second base station 120-2, when the UE device 110 is entering the geographic area of the second base station 120-2. MME 135 may, in yet another example, perform an operation to handoff a UE device 110 from the second base station 120-2 to the first base station 120-1, when the UE device 110 is entering the geographic area associated with first base station 120-1. The MME may also interface with the AAA/HSS server 160 to provide authentication, authorization and accounting services for the EPC 137. When a UE device can be served by multiple base stations, the CMD server 153 may interact with the MME 135 to balance the load by handing off a UE device from a base station with a relatively high bandwidth load to a base station with a relatively low bandwidth load.

PGW 140 may include one or more computation or communication devices that gather, process, search, store, and/or provide information in a manner described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 140 may include a device that aggregates traffic received from one or more SGWs 130, etc. and may send the aggregated traffic to CMD server 153, to the Internet 165 or other network devices. In another example implementation, PGW 140 may receive traffic from CMD server 153, content source 145 or from the Internet 165 and may send the traffic toward one of the UE devices 110 via SGW 130 and base stations 120.

CMD server 153 may include one or more devices that gather, process, search, store, and/or provide content in a manner similar to that described herein. CMD server 153 may perform operations associated with content distribution within environment 100. For example, CMD server 153 may perform caching operations by obtaining content from content source 145 or from the Internet 165 and temporarily storing the content in a memory associated with CMD server 153. In one implementation, CMD server 153 may cache a particular content item based on its popularity (e.g., number of user subscriptions). In this instance, the CMD server 153 may consult the content subscription database to identify the popularity of a particular content item (as described above). The CMD server 153 may delete a cached content item based on, for example, a drop in the popularity or a rating of the item. In another example, CMD server 153 may a cache a particular content item (e.g., a recorded live event) for a predetermined time and delete the particular content after the predetermined time has expired (e.g., the CMD server may cache recorded recording of an event and delete it from the server after 5 days. CMD server 153 may retrieve particular content, from the memory, in response to a request to receive the particular content from user device 110.

CMD server 153, which may be associated with a service provider network (not shown), can also be used to direct content from one or more content sources 145 or from the Internet 165, to user device 110 in a manner that improves utilization of bandwidth, processing, and/or other resources associated with environment 100 and/or service provider network. For example, CMD server 153 may send messages, alerts or signals to the content source 145 to cause the content source 145 to send a particular content item to a particular UE device, without the content item passing through the CMD server 153. The content may be targeted to a particular user device 110 based on a subscription or selection by user device 110, a type of user device 110, a location of the user device 110, usage patterns of user device 110, preferred content and/or genres associated with user device 110 or a user of user device 110, etc.

As described herein, CMD server 153 may monitor traffic flowing to and/or from the network 100 to determine whether a condition (e.g., congestion, jitter, packet delay, loss, and/or mis-ordered packets, etc.) exists. CMD server 153 may perform an operation that avoids and/or remedies the condition (e.g., reserve or adjust bandwidth to accommodate demand by user devices 110). For example, CMD server 153 may adjust bandwidth assigned to particular channels to avoid and/or remedy congestion or other conditions. In this regard, the CMD server 153 may determine an amount of available bandwidth at various nodes in the network and allocate that bandwidth among the eNBs 120, taking into account that bandwidth used by a first eNB 120-1 may not interfere with bandwidth used by a second eNB 120-N, located at least a predetermined distance away from the first eNB 120-1. In one implementation, the CMD server 153 controls the operation of the base stations 120 via commands and/or data sent to the base stations. Using these commands, the CMD server 153 may specify both the source and destination of the data stream as well as whether the data stream is to be unicast or multicast. For example, the command may be in the form of a Radio Resource Control (RRC) message (e.g., a START multicast command), which may result in a set of control signaling for a multicast of a content. The control signaling may trigger the base stations 120 to switch a particular data stream from a unicast to a multicast mode.

As also described herein, CMD server 153 may monitor incoming and/or outgoing traffic, being carried by service provider network, to obtain information associated with traffic sent to and/or received from UE device 110.

As further described herein, CMD server 153 may perform an operation to optimize the content being transported to the user devices 110. CMD 153 may, for example, convert the content into a tailored format that can be easily rendered on a variety of types of user devices 110 (e.g., 240p resolution video for a smart phone or higher resolution for tablets or computers). In one implementation, the CMD server 153 may consult the content subscription database to determine the preferred format for a particular content item. As described above, the database may indicate that video data should be sent as a 720p when a UE device is on its home network, stream but as a 420p stream when the device is roaming. In another example, the CMD server 153 may override the requested preferred format upon determining that the requested preferred format may cause heavy network congestion (e.g., the when it senses a congested network, CMD server 153 may multicast video data to two UE devices at 720p resolution even though the default for one of the devices is 1080p).

CMD server 153 may process the content to ensure that the traffic is optimally configured for transmission to user device 110 (e.g., converting packets to a maximum transmission unit (MTU), performing packet compression, etc.). CMD 153 may control the transmission of the content by the base stations 120 at a bandwidth and/or data rate that maximizes throughput and/or minimizes congestion among all of the base stations 120.

CMD server 153 may receive a notification from a base station that a condition will occur (e.g. more than a threshold number of dropped packets) or has occurred, within the base station 120, and may take preemptive or corrective action, in response to the notification. Such action may include transporting content to user device 110 in a manner that remedies, mitigates, or avoids the condition. CMD server 153 may process content in order to ensure that the content is sent to user devices 110 in a manner that satisfies a minimum quality of service (QoS) threshold for each device. In one implementation, the CMD server 153 may consult the content subscription database (as described above) prior to converting the content. In addition to the information related to the content, the database may also include information related to default preferred formats corresponding to the different types of UE devices 110 (e.g., 240p resolution video for a smartphone or higher resolution for a tablet or computer). As such, CMD server 153 may convert content into a format (e.g., a lower video resolution or frame rate) and/or protocol based on a type of user device 110. The CMD server may determine the type of device from the user profile data on the UE device obtained from the AAA/HSS 160. In another example, CMD server 153 may process the content by sending the content to user devices 110 at a bandwidth, data rate, and/or packet size that maximizes network throughput without inducing congestion, jitter, and/or other conditions.

Additionally, or alternatively, CMD server 153 may access a table or a database (not shown) to determine which UE devices are receiving or storing a requested content stream. The database may contain information for (eNB, UE) pairs and their corresponding associated content. For example, based on the determination, CMD server 153 may determine whether the content should be transmitted to UE device 110 via a multicast transmission service or a unicast transmission service.

CMD server 153 may proxy requests from UE devices 110 via eNBs 120, the SGW 130 and PGW 140 to the Internet 165 via the PGW 140. For example, the request may be for content that is stored or in streaming from the content source 145 or from the Internet 165. As such, the CMD 153, upon receiving the request from the UE via the SGW 130 and PGW 140, may proxy the request by sending the request to the Internet, via the PGW 140, or to the content source 145 hosting the streaming content.

The CMD server 153 may attempt to optimize the delivery of the content. For example, upon accessing the database related to the eNB/UE pair, CMD 153 may determine the 'nearest' UE device storing the requested content (e.g. UE device 110-1), so that the requested content may be provided efficiently from the nearest UE device to the requesting UE device (e.g. UE device 110-2) thereby reducing the number of network components used. Alternatively, CMD 153 may optimize the delivery of content by optimizing the (UE/eNB) database so that the time required to access the database is minimized.

CMD server 153 may also verify authorization for content sharing for different UE devices, as detailed below (e.g. in the description of FIG. 3). For example, CMD server 153 may communicate with the AAA/HSS server 160 to perform such verification. Alternatively, CMD server 153 may maintain a database that includes information concerning different UE devices and their corresponding authorization information related to sharing of content.

Content source 145 may include any type or form of content provider. For example, content source 145 may include free television broadcast providers (e.g., local broadcast providers, such as NBC, CBS, ABC, and/or Fox), for-pay television broadcast providers (e.g., TNT, ESPN, HBO, Cinemax, CNN, etc.), on-demand content providers (e.g., FiOS, cable, and/or satellite service providers), and/or Internet-based content providers (e.g., YouTube, Vimeo, Netflix, Hulu, Veoh, etc.) that stream content from web sites and/or permit content to be downloaded (e.g., via progressive download, etc.). Content source 145 may produce multimedia streams (e.g., video broadcasts).

HSS/AAA server 160 may include one or more devices that gather, process, search, store, and/or provide information in a manner described herein. For example, HSS/AAA server 160 may manage, update, and/or store, in a memory associated with HSS/AAA server 160, profile information, associated with user device 110, that identifies applications and/or services that are permitted for and/or accessible by user device 110; information associated with a user of user device 110 (e.g., a username, a password, a personal identification number (PIN), etc.); rate information; minutes allowed; and/or other information. Additionally, or alternatively, HSS/AAA server 160 may perform authentication, authorization, and/or accounting (AAA) operations associated with a communication session with user device 110. MME 135 may receive authorization from HSS/AAA server 160, in response to an attachment request from user device 110, before MME 130 creates and stores a context for user device 110.

While implementations described herein are described primarily in the context of broadband services to/from the UE devices via LTE, other wireless standards may be used. For example, components conforming to LTE standards described herein may be replaced by components conforming to other network standards (e.g., GSM, WCDMA, UMB, UMTS, CDMA2000, HSPA, 802.11, or other network standards).

Figure 2:
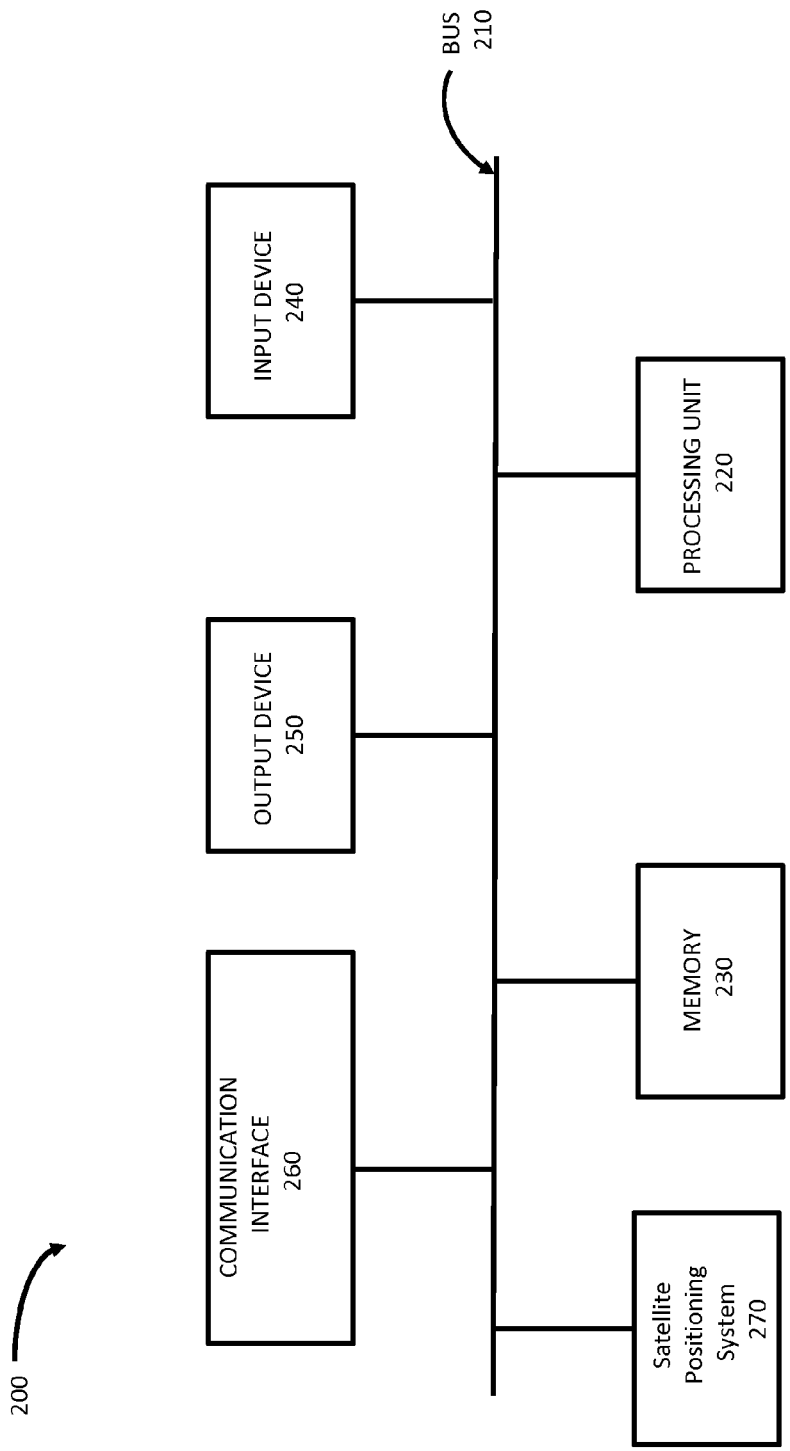
FIG. 2 is a block diagram of example components of a device that may be utilized in the environment of FIG. 1.

FIG. 2 is a diagram of example components of a device 200 according to one or more implementations described herein. In certain implementations, a portion or all of device 200 may correspond to one or more of the devices depicted in FIG. 1. For example, device 200 may correspond to UE device 110, SGW 130, MME 135, PGW 140, content source 145, AAA/HSS 160 or CMD server 153. Additionally, each of UE device 110, SGW 130, PGW 140, content source 145 or CMD server 153, may include one or more devices 200 or one or more components of device 200 and multiple ones of the SGW 130, PGW 140, content source 145 or CMD server 153 may be implemented in a single one of the devices 200.

As depicted, device 200 may include bus 210, processor 220, memory 230, input device 240, output device 250 and communication interface 260. Also, if the device 200 is a UE device 110, it may include a satellite positioning system (SPS) receiver 270. However, in other implementations, device 200 may include fewer components, additional components, different components, or differently arranged components than those illustrated in FIG. 2.

Bus 210 may include one or more component subsystems and/or communication paths that enable communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 220 may control the overall operation, or a portion thereof, of device 200, based on, for example, an operating system, and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. The memory 230 may include computer-readable medium, defined as a non-transitory memory device. A memory device may include space within a single physical memory device or be spread across multiple physical memory devices.

Input device 240 may include one or more components that permit a user to input information into device 200. For example, input device 240 may include a touch-screen, keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type optical, wireless or wired interface. Communication interface 230 may also include an antenna (or a set of antennas) that permit wireless communication, such as the transmission and reception of radio frequency (RF) signals in accordance with the applicable standard for wireless communications with the base station 120.

The optional SPS receiver 270 of a UE device 110 is used in some implementations to provide location information to the CMD server 153. Alternatively, the processor 220 may generate the location information, for example, as the identity of the base station 120 servicing the UE device. The location data provided by the UE device 110 is then stored in the CMD server 153. The location of the UE device 110 may be used to determine which base station(s) 120 can service the UE device. Alternatively, the assignment of UE devices 110 to base stations 120 may be determined by relative signal strength measurements among the UE devices 110 and base stations 120.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 5:
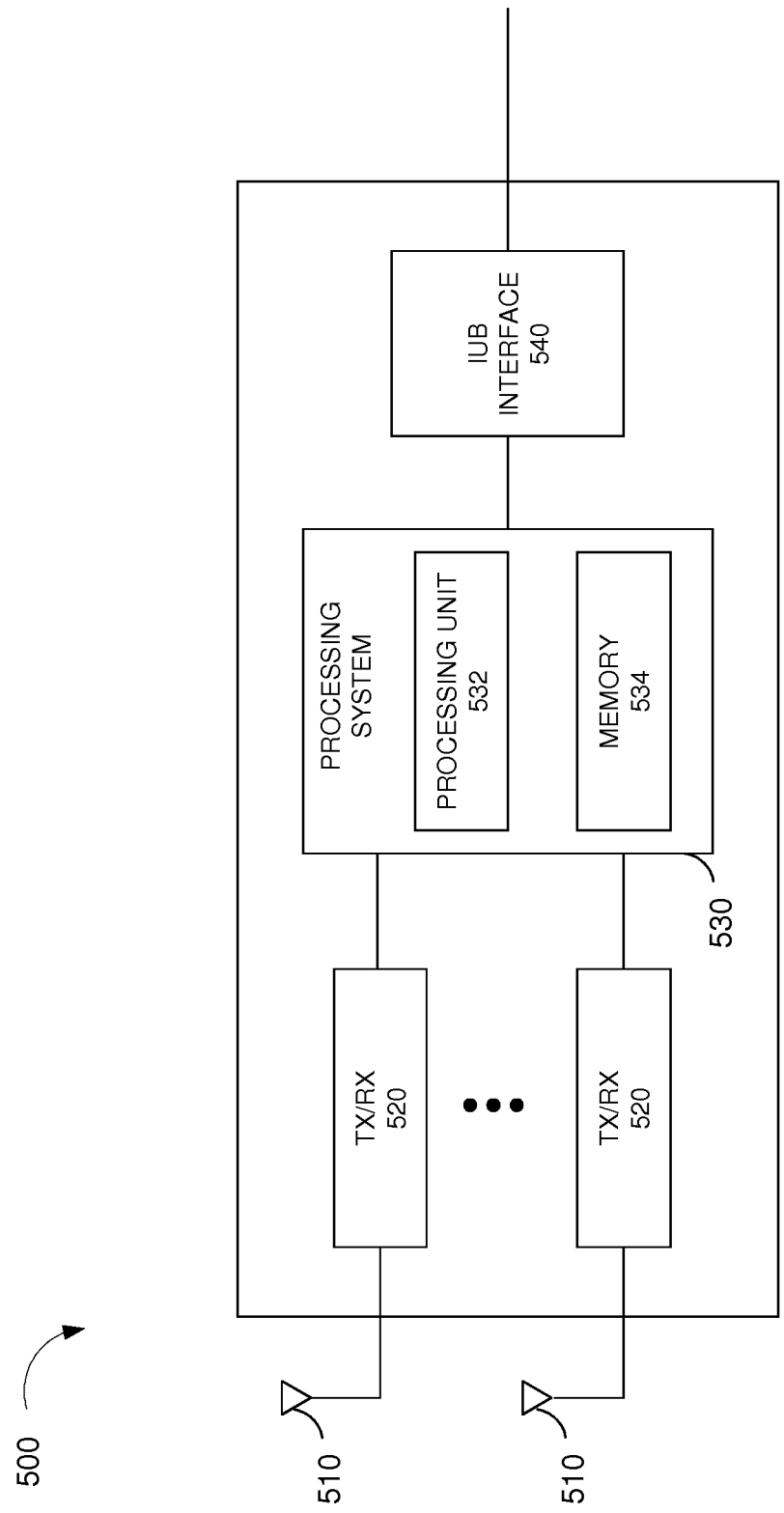
FIG. 5 is a block diagram of a base station according to one or more implementations described herein.

FIG. 5 is a diagram of functional components of device 500 that may correspond to one or more of the base stations 120 according to one or more of the implementations described herein. Alternatively, or additionally, device 500 may include one or more devices 500 and/or one or more portions of devices 500.

Processing system 530 may control the operation of device 500. The example processing system 530 also processes information received via transceivers 520 and Iub interface 540. Processing system 530 further measures quality and strength of a connection, determines a frame error rate (FER), and provides this information to one or more other devices in environment 100. As illustrated, processing system 530 includes a processing unit 532 and a memory 534.

Processing unit 532 of base station 120 includes one or more processors, microprocessors, application specific integrated circuits (ASICs), field programmable gate arrays (FPGAs), or the like. Processing unit 532 processes information received via transceivers 520 and Iub interface 540. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 532 may transmit control messages and/or data messages, and cause those control messages and/or data messages to be transmitted via transceivers 520 and/or Iub interface 540. Processing unit 532 may also process control messages and/or data messages received from transceivers 520 and/or Iub interface 540. For example, the processing unit may process X2 messages from other base stations and/or Radio Resource Control (RRC) messages from the CMD server 153.

The example memory 534 includes a random access memory (RAM), a read-only memory (ROM), and/or another type of non-transitory memory to store data and instructions that may be used by processing unit 532.

Iub interface 540 includes one or more line cards that allow device 500 to transmit data to and receive data from, for example, CMD server 153.

As described herein, example device 500 performs certain operations in response to processing unit 532 executing software instructions contained in a non-transitory computer-readable medium, such as memory 534. The software instructions are read into memory 534 from another computer-readable medium or from another device via antennas 510 and transceivers 520. The software instructions contained in memory 534 cause processing unit 532 to perform processes described herein. Alternatively, hardwired circuitry may be used in place of or in combination with software instructions to implement processes described herein. Thus, implementations described herein are not limited to any specific combination of hardware circuitry and software.

Figure 3:
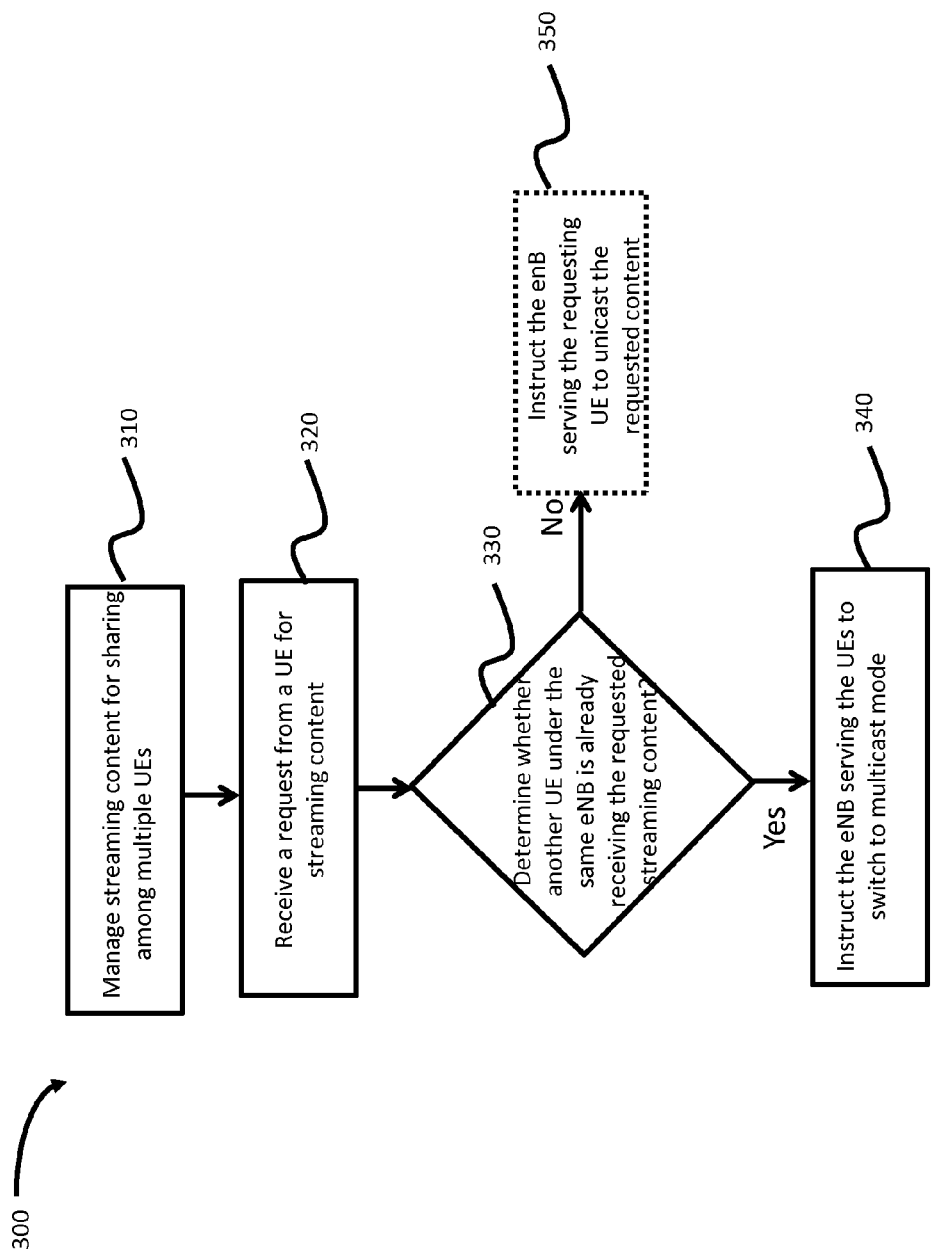
FIG. 3 is a flow-chart diagram of an example process executed by a content management delivery (CMD) server to deliver content via unicast/multicast according to one or more implementations described herein.

FIG. 3 is a flow chart of an example process 300 that runs on CMD server 153 according to one or more implementations described herein. In one or more implementations, process 300 may be performed by one or more components of CMD server 153. In other implementations, one or more blocks of process 300 may be performed by one or more other components/devices, or a group of components/devices, including or CMD server 153.

In this example, the CMD server 153 may manage content (block 310). As described above, content may include any variety or combination of audio, video and data programming. Examples include: camera feeds, audio commentary, web content, text, music, concerts, radio programs, television programs, videos, shows, movies and/or one or more other types of media-based programming. In one example, these content items may be stored or cached locally in the CMD server 153. In another example, the CMD server 153 may communicate with another server (e.g., content source 145) to obtain a specific content item upon receiving a request for the item from a UE device 110. The CMD server 153 may also access the Internet 165, via the PGW 140 to obtain requested content.

Management of the content may include maintaining a database (not shown) by the CMD server 153, for example. The database may have data related to currently cached content and content available from the content source 145. It may also include information related to an association of content with different UE devices 110. The database may also have information related to an association of the eNBs 120 with different UE devices 110. The management of the content may help to improve the delivery of content. The CMD server 153 may also manage content by associating subscription information obtained from the AAA/HSS server with the corresponding content.

At block 320, the CMD server 153 may receive a request from a UE device 110 to stream a particular content item.

At block 330, upon receiving the request for the content, the CMD server 153 may determine whether another UE device (e.g. device 110-2) is already receiving the content via the same eNB (e.g. eNB 120-1). The determination may be based upon accessing the table, described above, that provides information for (eNB, UE) pairs and their corresponding content. In one example, the CMD server 153 may identify UE 110-2 as receiving the requested content via the same eNB 120-1. In another example, the CMD server 153 may identify another UE device 110-3 as receiving the requested content, however, via a different eNB, 120-2. Instead of accessing the table, the CMD server 153 may identify the eNB 120 that is streaming the content by querying the eNBs 120 for their UE information. For example, the CMD server 153 may sequentially query the eNBs 120-1 through 120-N for their UE assignments via radio resource control (RRC) messaging and query the MME 153 to determine the content being provided to the UE devices 110.

If the CMD server 153 determines that none of the UE devices 110 is currently receiving the requested content, the CMD server 153 may obtain the content. For example, the CMD server 153 may proxy the request from UE 110-1 via eNB, SGW 130 and PGW 140 to the Internet 165 via the PGW 140 by accessing a domain name server (DNS) (not shown) to obtain a Universal Resource Locator (URL) for the requested data and then accessing the data, again via the PGW 140, using the URL. Alternatively, the CMD server 153 may determine whether the requested content is available from the content source 145 and, if it is, direct the content source 145 to provide the content to the UE device 110-1 via the eNB 120-1. For example, the request may be for a live streaming of a football game. As such, the CMD server 153, upon receiving the request from the UE 110-1, may send a message to the content source 145 to determine if the data stream is available and, then send a command to the content source 145 causing the content source 145 to format the requested data stream appropriately for the UE device 110-1 and to send the formatted stream to the eNB 120-1. In another example, if the request from the UE device 110-1 includes content that is already cached in the CMD server 153, the CMD server 153 may provide the requested content directly to the eNB 120-1.

Once it has obtained or identified a source for the requested content, the CMD server 153 may instruct the eNB 120-1 that is servicing the requesting UE 110-1, via RRC messaging, to provide the requested data stream in a unicast mode. The CMD server 153 may then provide the requested content via PGW, SGW, eNB (in the unicast mode) to the requesting UE (block 350).

Alternatively, if the CMD server 153 determines, in block 330, that another UE 110-2 is receiving the requested content via the same eNB 120-1, the CMD server 153 may instruct the eNB 120-1 to switch to a multicast mode. The instructions may be passed to the eNB from the CMD via RRC messaging. Upon switching, the eNB 120-1 may serve both the requesting UE 110-1 and the UE 110-2 that was already receiving the streaming content by routing the delivery of the streaming content locally. This may help to optimize the delivery of content (block 340). In one implementation, CMD server 153 may switch to multicast from unicast based on the popularity or rating of the requested content item. Alternatively, CMD server 153 may transition to multicast for a requested streaming content item upon determining that the multicast stream satisfies a minimum QoS of the requesting UE devices. In yet another example, CMD server 153 may switch to multicast upon receiving a message from a network administrator, specifying to switch to multicast for a streamed content item. In another implementation, CMD server 153 may switch from unicast to multicast upon determining that such a switch allows the eNB to serve more UE devices within its bandwidth limitations.

In another implementation, the CMD server 153 may instruct the source UE (e.g., UE device 110-2 that is currently receiving the content) to deliver the content to the requesting or target UE (e.g., UE device 110-1). The CMD server 153 may instruct the UE device 110-2 to provide the content to UE device 110-1 via a message to an application (App) running on the UE device 110-2 that receives the streaming content. This instruction may instruct the UE device 110-2 to send the content directly to the UE device 110-1 via another network protocol, for example, IEEE 802.11 or 802.14. The application may ask the user of the source UE device 110-2 to authorize sharing of the content with the target UE device 110-1 prior to initiating the transmission.

The CMD server 153, in one implementation, may communicate with AAA/HSS server 160 to obtain authorization for both the source and the target UE devices 110-2 and 110-1 related to content sharing. For example, authorization information may include whether the UE device 110-1 is authorized to receive multicast content. Authorization information may also include whether the UE device 110-2 has authorized the sharing of its content with another UE. Alternatively, CMD server 153 may store such authorization information in a database.

In one example, CMD server 153 may keep track of reward information for UE devices that are willing to share their content streams. For example, the source UE 110-2 may receive discount for downloading future content or may receive an upgrade on a data package as a rewards for sharing content with the target UE 110-1.

Yet in another implementation, if the CMD server 153 determines that the source UE device (e.g. 110-3) is served by a different eNB (e.g. 120-2), the multicast optimization may be available if the eNB 120-2 close enough to the eNB 120-1 so that communication between the two eNBs may take place via an X2 interface (i.e., logical interface between the two eNBs). In one implementation, the CMD server 153 may make this determination based on information in the database including the eNB/UE pair data.

In this implementation, the CMD server 153 may instruct eNB 120-2 to initiate an X2 communication with base station 120-1 to deliver the requested content. Upon receiving the instruction from the CMD server 153, the eNB 120-2 may send a message to the eNB 120-1 to establish the content stream. The eNB 120-1 may then send the content to the UE device 110-1 as a unicast stream. Thus, the streaming content may be shared between UE devices 110-3 and 110-1.

Figure 4:
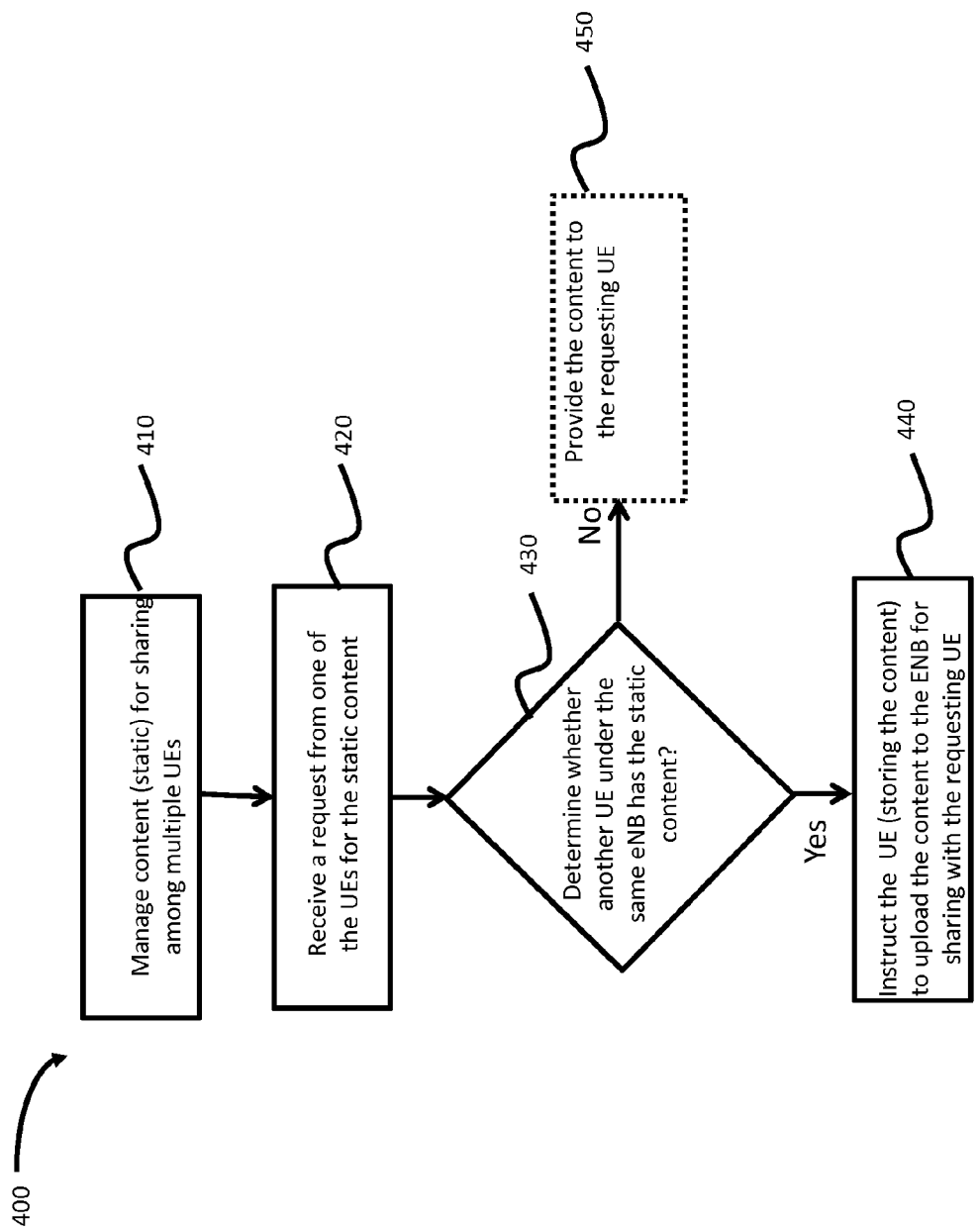
FIG. 4 is a flow-chart diagram of details of another example process executed by the content management delivery server.

FIG. 4 is a flow-chart diagram of an alternative process for sharing static (non-streaming) content that may be performed by the CMD server 153. In addition to managing streaming content, the CMD server 153 may manage content that is static. For example, the content may be a prerecorded video. Rather than being streamed, this content may be transferred to the requesting UE device. In one implementation, the content may be stored in one or more UE devices 110. The CMD server 153 may manage the static content (block 410) and keep track of the stored content in the different UE devices 110, as discussed previously with reference to FIG. 3.

At block 420, the CMD server 153 may receive a request for static content from a requesting UE device (e.g., UE 110-1). The pathway for receiving the request may consist of network elements such as eNB 120-1, SGW 130 and PGW 140 and CMD 153.

At block 430, the CMD server 153 may determine whether another UE (e.g., UE 110-2) has previously stored the static content under the same eNB (e.g., eNB 120-1). The determination may be based upon accessing a table that provides information for (eNB, UE) pairs and any corresponding associated content that has been accessed in the recent past (e.g. one day). Thus, CMD server 153 may identify that both the requesting UE (e.g., UE 110-1) and the UE storing the static content (i.e., UE 110-2), are being served by the same eNB (i.e., base station 120-1). Based on the table information, the CMD server 153 may identify another UE device (e.g., UE 110-3) that may also have stored the requested content, however, under a different eNB (e.g., eNB 120-2). Alternatively, the identification may be based on querying an eNB for information on content items currently stored on its corresponding UE devices. For example, the CMD server 153 may query for eNB assignments via RRC messaging. The eNB 120, in turn, may obtain this information by querying its corresponding UE devices 110, if such querying is permitted by the users.

If the CMD server 135 determines that another UE device (e.g., UE 110-2) has stored the requested content and is served by the same eNB (e.g., base station 120-1), the CMD server 135 may request that the UE device 110-2 share the static content with the UE device 110-1 via the eNB 120-1. Upon receiving the request, the UE device 110-2 may upload the static content to the eNB 120-1 and thus, route the static content via the eNB 120-1 to the UE 110-1. Such routing of the data to share the static content may avoid the usage of the other network elements (e.g., SGW, PGW), and thus improve system performance. Alternatively, if the CMD server 153 determines that the content is stored in UE device 110-3, the CMD server 153 may then request that UE 110-2 share the stored static content via a route from the UE device 110-3 to eNB 120-2, and then to eNB 120-1 via X2 messaging. eNB 120-1 then transfers the requested content to UE 110-1. (block 440)

If, however, at block 430, the CMD server 153 determines that none of the UE devices has stored the requested static content but that the CMD server has a copy, the CMD server 153 may provide the requested content. If, for example, the CMD server 153 has cached the static content, the CMD server 153 may provide the content to the eNB 120-1 via the PGW 140 and SGW 130. If the static content is available on the Internet, the CMD server 153 may proxy the request, as described above. (block 450).

It is noted that example programs shown in FIGS. 3 and 4 may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving a request from a target user equipment (UE) device from one of multiple UE devices in a network for a content item;
    identifying at least one UE device of the multiple UE devices, other than the target UE device, to which the requested content item is being provided;
    determining whether the target UE device and the at least one UE device are serviced by a common base station in the network;
    upon determining that the target UE device and the at least one UE device are serviced by a common base station, instructing the common base station to multicast the requested content item to the target UE device and to the at least one UE device; and
    managing content including the requested content item by maintaining a database in the network, the database including information related to the managed content indicating content items that are currently being received by the multiple UE devices and associations among the multiple UE devices and corresponding base stations of the network,
    wherein the managing content further includes:
        obtaining authorization information of the target UE device related to the requested content item before providing the requested content item to the target UE device, and
        upon determining that the target device has an authorization to receive the requested content item, causing the requested content item to be sent to the target device.

2. The method of claim 1, wherein the identifying further includes identifying the at least one UE device and a corresponding base station servicing the at least one UE device by accessing the database including associations among UE devices and base stations.

3. The method of claim 1, further including:
    receiving a request from an other target UE device of the multiple UE devices, for an other content item, wherein the other target UE device is serviced by the common base station;
    determining whether the other content item is being provided by another base station in the network to an other UE device of the multiple UE devices;
    upon determining that the other content item being provided by the other base station, signaling the other base station to send the other content item to the common base station; and
    signaling the common base station to unicast the other content item to the other target UE device.

4. The method of claim 3, wherein the signaling the other base station to send the other content item to the base station includes commanding the other base station to send the other content item to the common base station using X2 messaging.

5. The method of claim 1, further including:
    receiving a request from an other target UE device of the multiple UE devices, for an other content item;
    determining whether the other content item is being provided to any of the multiple UE devices other than the other target UE device; and upon determining that the other content item is not being provided to any of the multiple UE devices, providing the other content item to the other target UE device from the network via an other base station of the network.

6. The method of claim 1, wherein the instructing comprises, instructing the common base station to route the requested content item to the target UE device without traversing other components of the network.

7. A method comprising:
receiving a request from a target user equipment (UE) device of multiple UE devices in a network for a content item;
identifying at least one source UE device of the multiple UE devices, other than the target UE device, that has stored the requested content item;
determining whether the target UE device and the source UE device are serviced by a common base station;
upon determining that the target UE device and the source UE device are serviced by a common base station, instructing the source UE device to share the stored requested content item with the target UE device via the common base station; and
managing content including the requested content item by maintaining a database in the network, the database including information related to the managed content indicating content items that have been stored by the multiple UE devices,
wherein the managing content further includes:
obtaining authorization information of the target UE device related to the requested content item before providing the requested content item to the target UE device, and
upon determining that the target device has an authorization to receive the requested content item, allowing the requested content item to be sent to the target device.

8. The method of claim 7, further including instructing the base station to route the stored content item from the source UE device to the target UE device without traversing other components of the network.

9. The method of claim 7, further including:
instructing the source UE device to upload the requested content item to the common base station; and
instructing the base station to download the requested content item to the target UE device.

10. The method of claim 9, includes information identifying associations among the multiple UE devices and corresponding base stations of the network.

11. The method of claim 10, further including
receiving a request from an other target UE device of the multiple UE devices in the network for an other content item, wherein the other target UE device is serviced by a first base station in the network;
identifying an other source UE device of the multiple UE devices, other than the other target UE device, that has stored the other content item, wherein the other source UE device is serviced by a second base station in the network, different from the first base station;
determining whether the other source UE device authorizes sending the other content item to the other target UE device; and
upon determining that the other source UE device has authorized sending the other content item to the other target UE device sending the other content item to the other target UE device.

12. The method of claim 9, further including
receiving a request from an other target UE device of the multiple UE devices in the network for an other content item, wherein the other target UE device is serviced by a first base station in the network;
identifying an other source UE device of the multiple UE devices, other than the other target UE device, that has stored the other content item, wherein the other source UE device is serviced by a second base station in the network, different from the first base station;
determining whether the other source UE device authorizes sending the other content item to the other target UE device; and
upon determining that the source UE device has authorized sending the content item to the other target UE device, signaling the other source UE device to upload the other content item to the second base station, signaling the second base station to send the other content item to the first base station and signaling the first base station to send the other content item to the other target UE device.

13. The method of claim 12, wherein the identifying the other source UE device that has stored the other content item includes identifying the other source UE device storing the content and the second base station by accessing a database and obtaining authorization information of the other target UE device related to the requested other content item before providing the requested other content item to the other target UE device, and upon determining that the other target device has an authorization to receive the requested content, causing the requested other content item to be sent to the other target device.

14. The method of claim 12, further including determining that the other source UE device has authorized sending the other content item to the other target UE device and providing a reward to the other source UE device upon determining that the other source UE device has authorized sending the other content item to the other target UE device.

15. The method of claim 7, wherein instructing the source UE device further includes:
providing a reward to the source UE device upon determining that the source UE device has authorized sending the content item to the target UE device.

16. A non-transitory computer readable medium including computer programming instructions, the instructions causing a processor to:
receive a request from a target user equipment (UE) device from one of multiple UE devices in a network for a content item;
identify at least one UE device of the multiple UE devices, other than the target UE device, to which the content item is being provided;
determine whether the target UE device and the at least one UE device are serviced by a common base station in the network;
obtain authorization information of the target UE device related to the requested content item before providing the requested content item to the target UE device, and upon a determination that the target UE device has an authorization to receive the requested content item, allow the requested content item to be sent to the target device; and
upon determining that the target UE device and the at least one UE device are serviced by a common base station, instruct the common base station to multicast the requested content item to the target UE device and the at least one UE device.

17. The non-transitory computer readable medium of claim 16, wherein the computer programming instructions further cause the processor to manage content including the requested content item by maintaining a database in the network, the database including information related to the managed content indicating content items that are currently being received by the multiple UE devices and associations among the multiple UE devices and corresponding base stations of the network.

18. The non-transitory computer readable medium of claim 16, wherein the computer programming instructions further cause the processor to:
receive a request from a further an other target UE device of the multiple UE devices, for an other content item;
determine whether the other content item is being provided to any of the multiple UE devices other than the target UE device; and
upon determining that the other content item is not being provided to any of the multiple UE devices, provide the other content item to the other target UE device from the network via an other base station of the network.

19. The non-transitory computer readable medium of claim 16, wherein the computer programming instructions further cause the processor to:
receive a request from an other target UE device of the multiple UE devices, for an other content item, wherein the other target UE device is serviced by the common base station;
determine whether the other content item is being provided by another base station in the network to an other UE device of the multiple UE devices;
upon determining that the other content item being provided by the other base station, signal the other base station to send the other content item to the common base station; and
signal the common base station to unicast the other content item to the other target UE device.

20. The non-transitory computer readable medium of claim 19, wherein determining whether the other content item is being provided by the other base station, the computer programming instructions further cause the processor to:
determine whether the other UE device has authorized sending the content item to the other target UE device; and
providing a reward to the other UE device upon determining that the other UE device has authorized sending the other content item to the other target UE device.

* * * * *